C. E. WAKE.
TRACTOR.
APPLICATION FILED MAY 28, 1917.
1,293,999.
Patented Feb. 11, 1919.
3 SHEETS—SHEET 1.
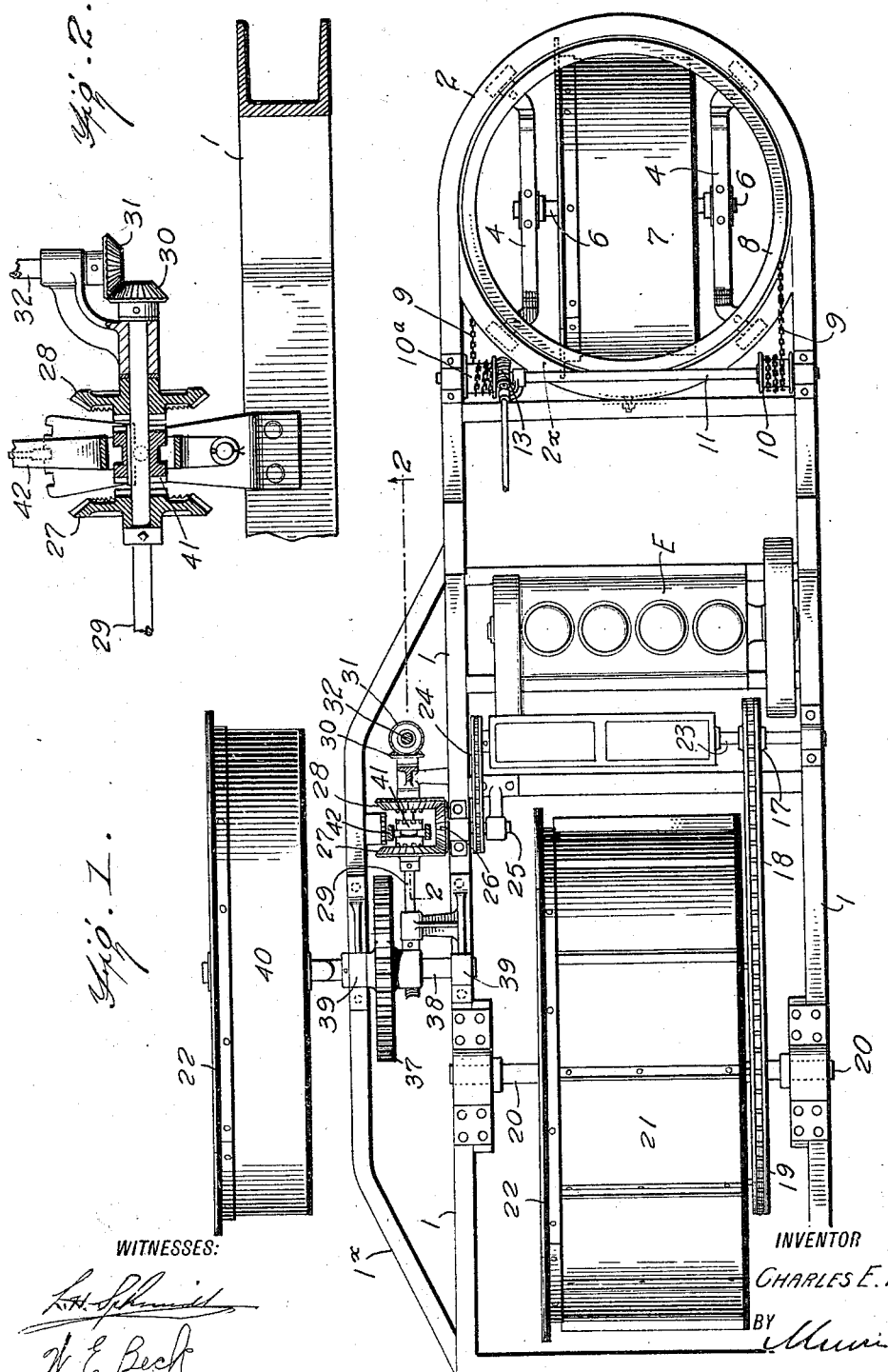
WITNESSES:
INVENTOR
CHARLES E. WAKE,
BY
ATTORNEYS

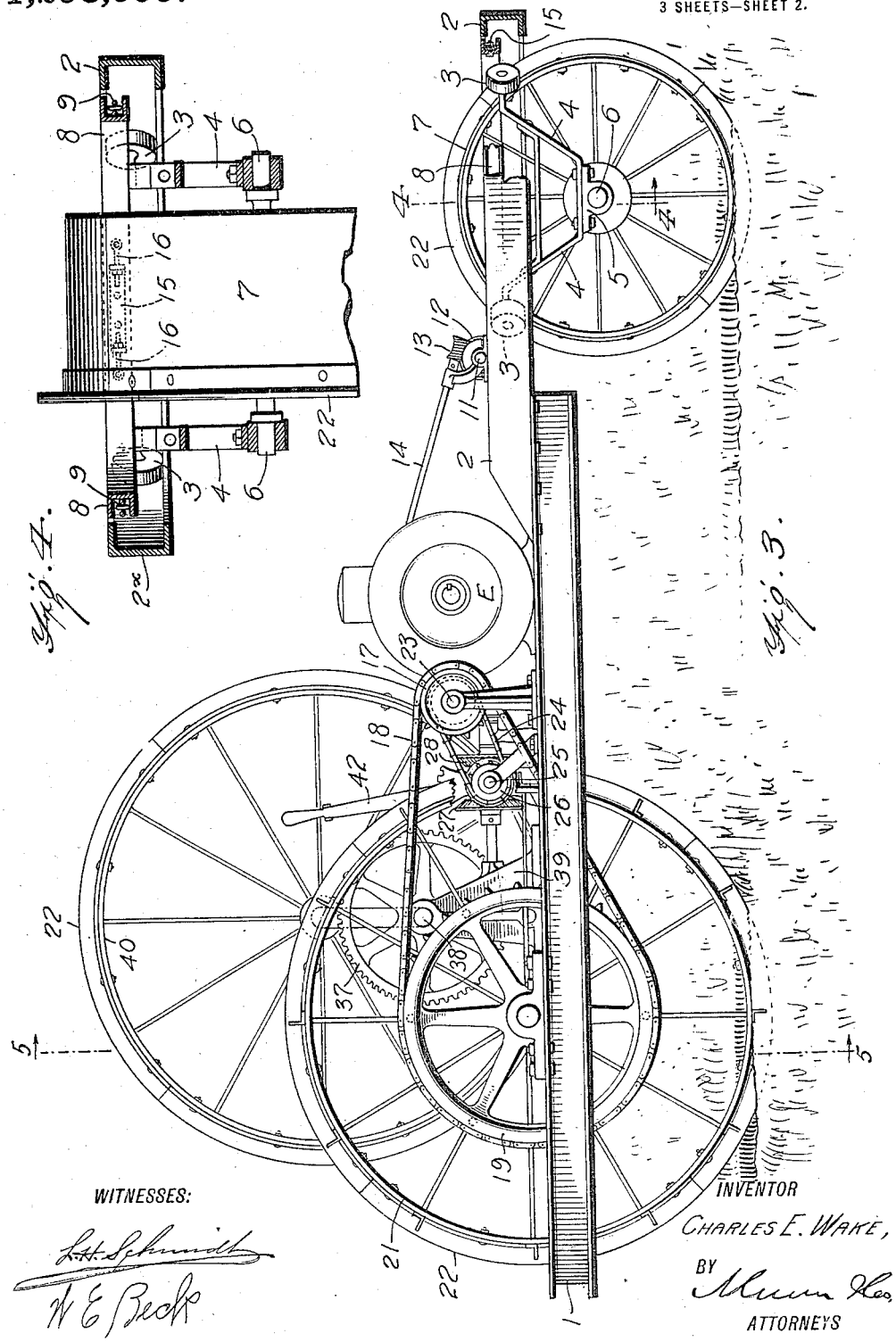

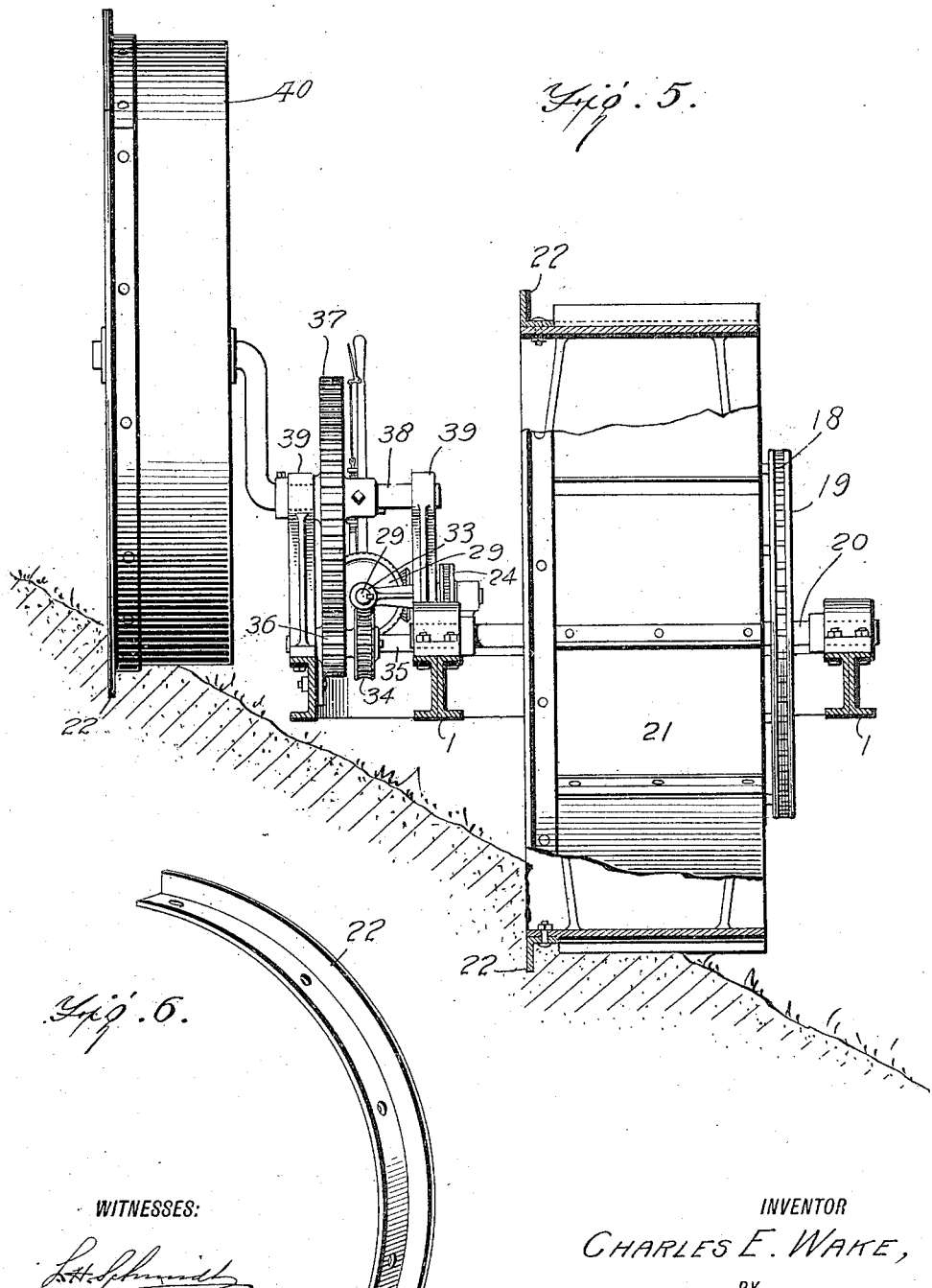

UNITED STATES PATENT OFFICE.

CHARLES E. WAKE, OF WALLA WALLA, WASHINGTON, ASSIGNOR TO C. A. HUNGATE, OF WALLA WALLA, WASHINGTON.

TRACTOR.

1,293,999.      Specification of Letters Patent.      Patented Feb. 11, 1919.

Application filed May 28, 1917. Serial No. 171,404.

*To all whom it may concern:*

Be it known that I, CHARLES E. WAKE, a citizen of the United States, and a resident of Walla Walla, in the county of Walla Walla and State of Washington, have made certain new and useful Improvements in Tractors, of which the following is a specification.

My invention relates to improvements in tractors, and it consists in the combinations, constructions and arrangements herein described and claimed.

An object of my invention is to provide a tractor which is especially adapted for use in districts which are hilly, the tractor being provided with a leveling wheel which will permit the device to easily run on the side of a hill.

A further object of my invention is to provide a device of the type described in which the raising or lowering of the leveling wheel is accomplished either manually or by means of power derived from the engine of the tractor.

A further object of my invention is to provide a device of the type described in which the steering of the apparatus is accomplished in a novel manner.

A further object of my invention is to provide a tractor whose wheels are provided with removable shoes made of angle iron, which prevent the slipping of the device in a side-wise direction.

My invention is illustrated in the accompanying drawings forming part of this application, in which, Figure 1 is a plan view of the device.

Fig. 2 is a sectional view along the line 2—2 of Fig. 1.

Fig. 3 is a side view of the device, certain parts being shown in section.

Fig. 4 is a section along the line 4—4 of Fig. 3.

Fig. 5 is a sectional view along the line 5—5 of Fig. 3, and,

Fig. 6 is a perspective view of a portion of the angle-iron shoe.

In carrying out my invention I provide a main frame 1, which is constructed of angle-iron suitably secured together. The front portion 2 of this frame is made in a circular form, and is provided with an extension $2^x$, which constitutes with the frame portion 2, a circular track, see Figs. 1 and 4.

Arranged to roll on the circular track is a series of rollers 3. These rollers are arranged in pairs as shown, and each pair supports brackets 4, the brackets 4 in turn carrying bearings 5 for the axle 6 of the front wheel 7.

At 8 I have shown a ring which is made of angle iron, and which is secured to the brackets 4. As will be seen from Fig. 4, the outer side of the ring 8 constitutes a groove, in which is disposed a chain 9, the ends of the chain being wound on drums 10 and $10^a$ carried on a shaft 11. A worm wheel 12 is mounted on the shaft 11, see Fig. 3, and may be driven by a worm 13 on a steering rod 14. It is obvious that when the rod 14 is turned the shaft 11 will be rotated. The chain 9 is so arranged that as it is rolled off from one drum it is rolled on the other. The chain is preferably in two parts, and is connected by a plate 15 through which extension bolts 16 project; as shown in dotted lines in Fig. 4. The tightening of these bolts will take up slack in the chain. The plate 15 being fastened to the ring 8, the latter, together with the wheel 7 will be turned as the ring is turned.

At E I have shown the engine or motor. The transmission gearing of the engine is connected by means of the sprocket wheel 17 and sprocket 18 with sprocket wheel 19 on the shaft 20, which forms the axle of a drive wheel 21. The latter is provided with a shoe 22 made up of sections of curved angle iron of the form shown in Fig. 6. This is to prevent the wheel from slipping side-wise on a hill.

The shaft 23 which is connected to the transmission gearing, is connected by a sprocket chain drive 24 with a shaft 25, which bears a gear 26. The latter is in mesh with two gears 27 and 28, respectively, which are loosely mounted on a shaft 29. This shaft 29 bears at one end a pinion 30 (see Fig. 2) which engages a pinion 31 on a rod 32. The opposite end of the shaft is provided with a worm 33 which engages a worm wheel 34 on a shaft 35 bearing a gear 36, the latter gear engaging a large gear 37 on a shaft 38 carried by bearings 39 (see Fig. 5). The outermost bearing 39 is disposed on an extension $1^x$ of the frame 1. The shaft 38 is prolonged and has two bends to bring it in Z-shaped form. A leveling wheel 40 is mounted for rotation on the outer end of the shaft 38. Disposed on the shaft 29 (see Fig.

2) is a slidable clutch 41 which is provided with a shifting lever 42.

From the foregoing description of the various parts of the device, the operation thereof may be readily understood.

In Fig. 5 I have shown the device as operating on a side hill and the leveling wheel 40 raised so as to bring the frame 1 substantially level. The leveling wheel 40 as well as the tractor wheel 7 is provided with a shoe 22 made up of sections as described.

The leveling wheel 40 may be raised or lowered either manually or by means of power from the engine itself. In moving the leveling wheel manually the rod 32 is turned so as to transmit rotary movement to the shaft 29. This will cause the Z-shaped shaft 38 to be rotated through the medium of the worm 33, worm wheel 34, shaft 35, gears 36 and 37, so as to bring the leveling wheel into the desired position.

If it is desired to make use of the power of the engine to raise or lower the leveling wheel, the engine is started, in which case the gear 26 (see Fig. 1) is driven through the medium of the sprocket chain 24. The gears 27 and 28 are loosely mounted on the shaft 29 and can only impart movement to the shaft when the clutch member 41 is shifted.

It will be obvious that when it is shifted in one direction the shaft 29 will be rotated in a given direction and when the clutch is shifted to engage the other gear a reverse movement of the shaft will take place. As soon as the Z-shaped shaft bearing the leveling wheel has been moved to bring the wheel to the proper height, the lever 42 is brought to its central position, thereby stopping any further movement of the leveling wheel.

I claim:—

1. A tractor comprising a frame, an engine carried by the frame, a single drive wheel, means for operating the drive wheel from the engine, a shaft rotatably mounted on said frame, means for rotating said shaft from the engine, a fixed gear carried by said shaft, an auxiliary shaft, a pair of loosely mounted gears carried by said auxiliary shaft and in constant engagement with said first named gear, a clutch member for connecting either of said loosely mounted gears with said auxiliary shaft, a leveling wheel, means actuated by said auxiliary shaft for raising and lowering said leveling wheel, and manual means for rotating said auxiliary shaft, at will.

2. In a tractor, a frame, a single drive wheel carried thereby, a steering wheel and leveling wheel, a Z-shaped shaft rotatably carried by said frame, one end of said Z-shaped shaft bearing said leveling wheel, and means for rotating said Z-shaped shaft to raise or lower said leveling wheel manually and by power derived from the tractor.

3. A tractor comprising a frame, an engine carried by the frame, a single drive wheel, means for operating the drive wheel from the engine, a shaft rotatably mounted on said frame, means for rotating said shaft from the engine, a fixed gear carried by said shaft, an auxiliary shaft, a pair of loosely mounted gears carried by said auxiliary shaft and in constant engagement with said first named gear, a clutch member for connecting either of said loosely mounted gears with said auxiliary shaft, a leveling wheel, and means actuated by said auxiliary shaft for raising and lowering said leveling wheel.

4. A tractor comprising a frame, an engine carried by the frame, a single drive wheel, means for operating the drive wheel from the engine, a shaft rotatably mounted on said frame, means for rotating said shaft from the engine, a fixed gear carried by said shaft, an auxiliary shaft, a pair of loosely mounted gears carried by said auxiliary shaft and in constant engagement with said first named gear, a clutch member for connecting either of said loosely mounted gears with said auxiliary shaft, a leveling wheel, and means actuated by said auxiliary shaft for raising and lowering said leveling wheel, said last named means comprising a Z-shaped shaft having one end pivotally mounted on said frame and the other end bearing said leveling wheel, and a train of gears disposed between said auxiliary shaft and said Z-shaped shaft for rotating the latter through the movement of the former.

5. A tractor comprising a frame, an engine carried by the frame, a single drive wheel, means for operating the drive wheel from the engine, a shaft rotatably mounted on said frame, means for rotating said shaft from the engine, a fixed gear carried by said shaft, an auxiliary shaft, a pair of loosely mounted gears carried by said auxiliary shaft and in constant engagement with said first named gear, a clutch member for connecting either of said loosely mounted gears with said auxiliary shaft, a leveling wheel, means actuated by said auxiliary shaft for raising and lowering said leveling wheel, said last named means comprising a Z-shaped shaft having one end pivotally mounted on said frame and the other end bearing said leveling wheel, a train of gears disposed between said auxiliary shaft and said Z-shaped shaft for rotating the latter through the movement of the former, and manual means for rotating said auxiliary shaft.

6. A tractor comprising a frame, an engine carried by the frame, a single drive wheel carried by the frame within the latter, a leveling wheel carried by the frame on the outside thereof, means for operating the drive wheel from the engine, and means for raising or lowering the leveling wheel manually and by the power derived from the engine of the tractor.

7. A tractor comprising a frame, an engine carried by the frame, a single drive wheel carried by the frame within the latter, a leveling wheel carried by the frame on the outside thereof, means for operating the drive wheel from the engine, means for raising or lowering the leveling wheel manually and by the power derived from the engine of the tractor, said means comprising a Z-shaped shaft having one end pivotally mounted on said frame and the other end bearing said leveling wheel, a train of gears, an auxiliary shaft, means for connecting said auxiliary shaft with the engine, manual means for rotating said auxiliary shaft, said train of gears being disposed between the auxiliary shaft and said Z-shaped shaft for rotating the latter through the movement of the former.

8. A tractor comprising a frame, an engine carried by the frame, a shaft rotatably mounted on said frame, means for rotating said shaft from the engine, a fixed gear carried by said shaft, an auxiliary shaft, a pair of loosely mounted gears carried by said auxiliary shaft and in constant engagement with said first named gear, a clutch member for connecting either of said loosely mounted gears with said auxiliary shaft, a leveling wheel, means actuated by said auxiliary shaft for raising and lowering said leveling wheel, said last named means comprising a Z-shaped shaft having one end pivotally mounted on said frame and the other end bearing said leveling wheel, and means for transmitting the movement of said auxiliary shaft to said Z-shaped shaft for rotating the latter.

CHARLES E. WAKE.

Witnesses:
GEORGE W. THOMPSON,
J. L. WINTERNUTE.

Copies of this patent may be obtained for five cents each, by addressing the "Commissioner of Patents, Washington, D. C."